Sept. 10, 1968 J. R. BURCH 3,401,311

COMPOSITE PHOTOELECTRIC RELAY INCLUDING AN ELECTROMAGNETIC RELAY

Filed April 14, 1966 3 Sheets-Sheet 1

INVENTOR
JAMES R. BURCH

BY David M. Schiller
ATTORNEY

COMPOSITE PHOTOELECTRIC RELAY INCLUDING AN ELECTROMAGNETIC RELAY

Filed April 14, 1966

INVENTOR.
JAMES R. BURCH

BY David M. Schiller

ATTORNEY

Sept. 10, 1968 J. R. BURCH 3,401,311

COMPOSITE PHOTOELECTRIC RELAY INCLUDING AN ELECTROMAGNETIC RELAY

Filed April 14, 1966 3 Sheets-Sheet 3

INVENTOR.
JAMES R. BURCH

BY David M. Schiller

ATTORNEY 1 2

3,401,311

COMPOSITE PHOTOELECTRIC RELAY INCLUDING AN ELECTROMAGNETIC RELAY

James R. Burch, Normal, Ill., assignor to General Electric Company, a corporation of New York Filed Apr. 14, 1966, Ser. No. 542,612
13 Claims. (Cl. 317—124)

Figure 2:
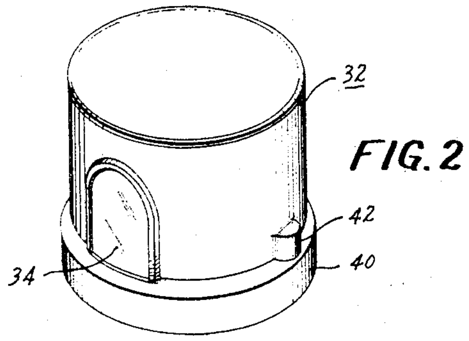

This invention relates to an improved assembly of a composite photoelectric control relay including an electromagnetic relay of improved design. More specifically, it relates to the construction of an electromagnetic relay, and the assembly of the electromagnetic relay in a unitary construction with other elements of a composite photoelectric control relay of improved design.

Prior art photoelectric relays have been constructed by mounting a complete electromagnetic relay including an insulating base and terminals for electrical connections on an assembly base or support, by providing brackets on the mounting base for mounting other circuit elements of the photoelectric relay, such as a photosensitive device and by separately securing termination prongs on the assembly base. In such prior art construction it was not only necessary to provide brackets and termination prongs, but it was also necessary to provide wiring between the various circuit elements, such as the electromagnetic relay, the photosensitive device, and the termination prongs. Further, since photoelectric control relays may be exposed to transient high voltage surges, a separate device has heretofore been provided within the photoelectric control relay housing for limiting such voltage surges, and it also must be supported by a bracket and connected electrically to the other circuit elements. In other words, prior art photoelectric control relays have been primarily an assembly of catalog type electrical devices and specially formed brackets for mounting the devices on an insulating base.

It is therefore an object of this invention to provide a novel and improved composite photoelectric control relay of inexpensive and compact design wherein the elements of an electromagnetic relay and other elements of the composite photoelectric relay are assembled on a single insulating base.

It is another object of this invention to provide a novel and improved composite photoelectric control relay including an insulating base which supports elements of an electromagnetic relay, and includes portions formed to support other circuit elements of the composite photoelectric control relay.

It is still another object of this invention to provide a novel and improved photoelectric control relay with voltage surge protection formed integrally therein.

It is a further object of this invention to provide a novel and improved electromagnetic relay such as might be used in a composite photoelectric relay, the contacts of which will not chatter on pick-up of the armature, and the contacts of which will not bounce on drop-out of the armature, and in which the pick-up and drop-out voltages may be readily adjusted.

These objects are accomplished in accordance with this invention, in one form thereof, by providing a molded insulating base having an integrally formed cradle thereon for releasably supporting a photosensitive device and other formed mounting surfaces for supporting other circuit elements of a composite photoelectric relay. An electromagnetic relay is formed on the base by mounting thereon a first formed metal member supporting a fixed contact, and a metallic support including a second formed metal member, which supports other portions of the electromagnetic relay, including an actuating coil, a magnetic core, an armature and a movable contact. These formed metal members are integrally formed with termination prongs which pass through apertures in the base, for plugging into a socket. The metallic support includes a U-shaped support frame one leg of which is secured to the base, while the other leg pivotally supports the relay armature. The magnetic core is supported by the base portion of the U-shaped frame and extends in the same direction as the legs. A U-shaped resilient member having a pair of arms and a base provides a spring force to bias the armature away from the core. One arm of the resilient member is secured to the armature, while the other arm is secured to the base portion of the U-shaped frame. The movable contact is carried on the free end of the arm secured to the armature, and is normally biased into engagement with the fixed contact by the spring force. This biasing arrangement is such that the spring load on the armature after pick-up is always less than the magnetic force on the armature provided by the coil, such that contact chatter is minimized. Further, on drop-out of the armature, the spring load is always greater than the magnetic force such that once the armature begins to move away from the core the contacts close without bouncing. The pick-up and drop-out voltages of the relay are adjusted by adjusting the position in which the resilient member is secured to the U-shaped frame. The composite photoelectric control relay is provided with a voltage limiting arrangement to protect the relay from voltage surges. This voltage limiting arrangement includes a third formed metal plate which together with the first and second formed metal members provides a pair of air gaps of a predetermined length which serve as spark gaps.

Figure 1:
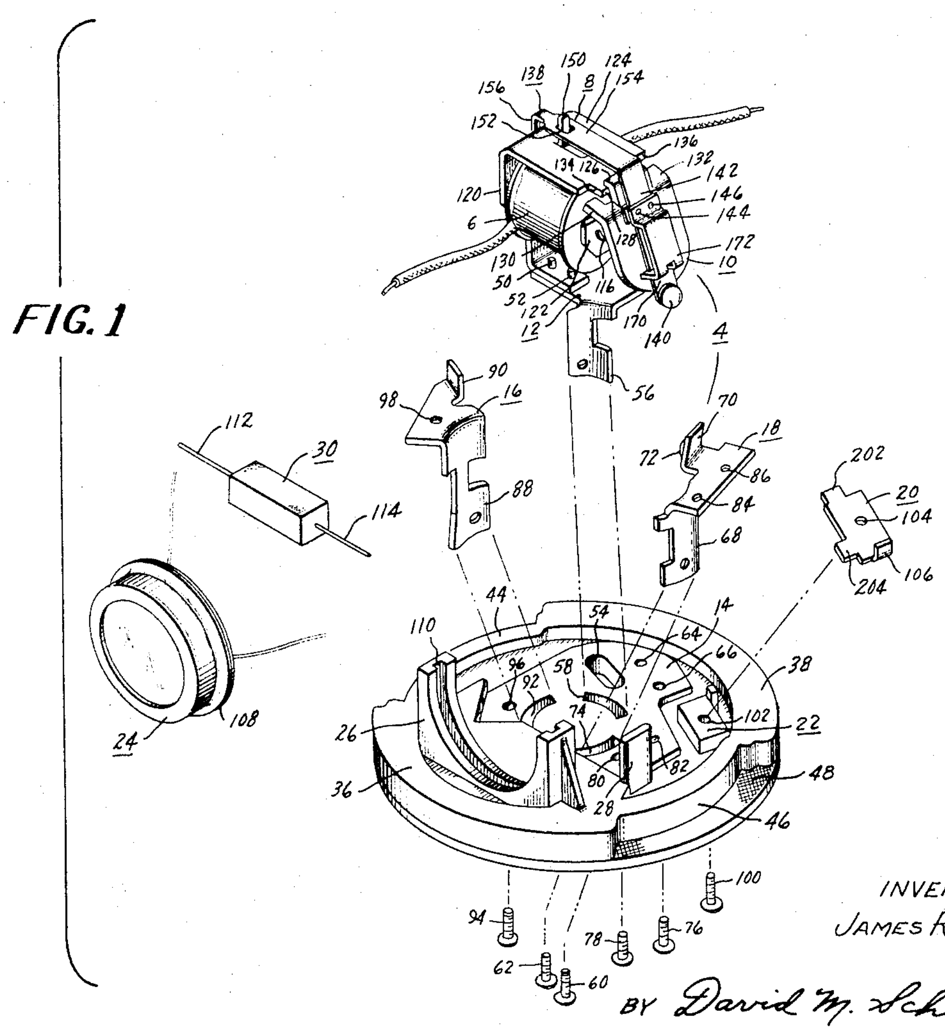
Figure 8:
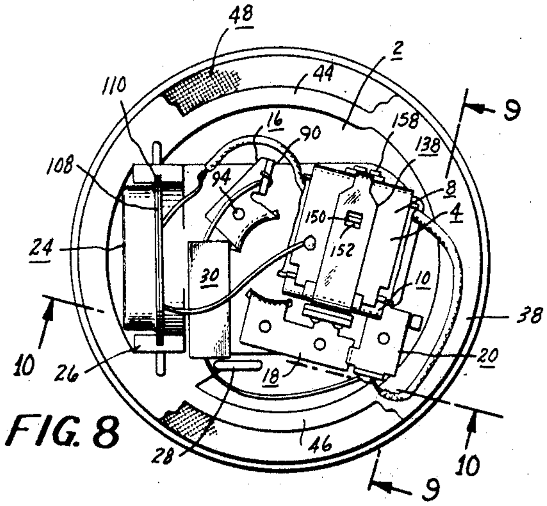
Figure 9:
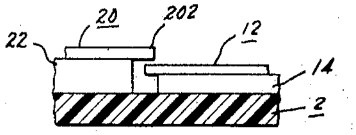
Figure 10:
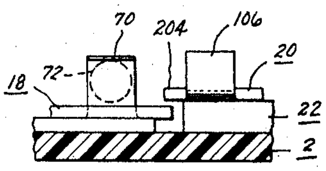
Figure 3:
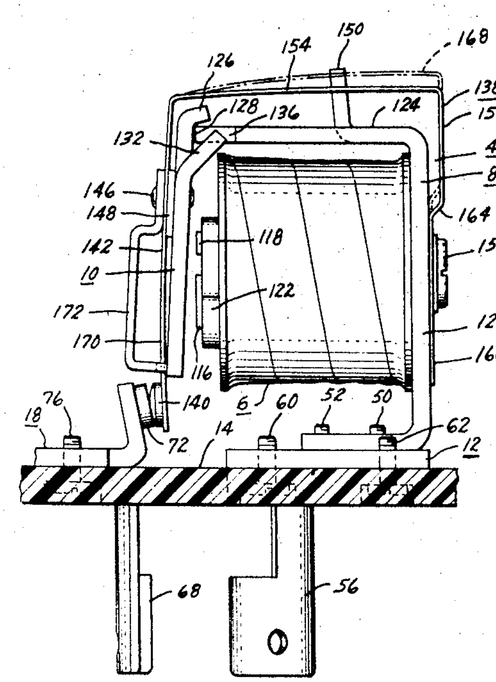
Figures 4, 5:
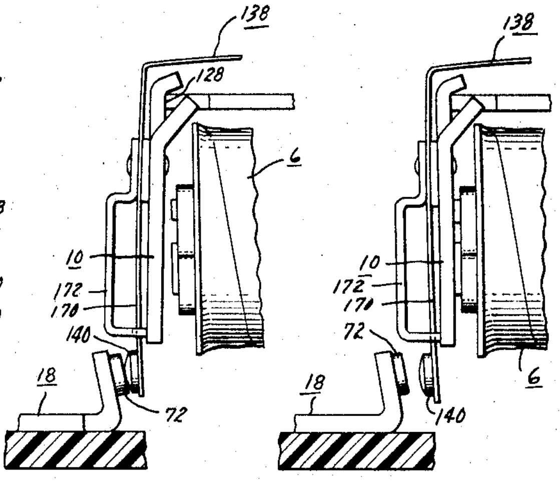
Figure 7:
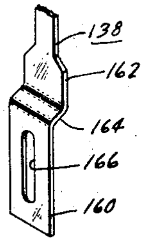
Figure 6:
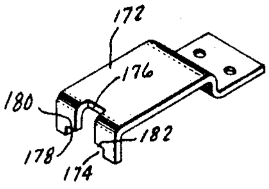
Figure 11:
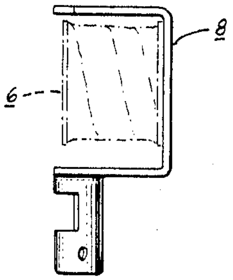
Figure 12:
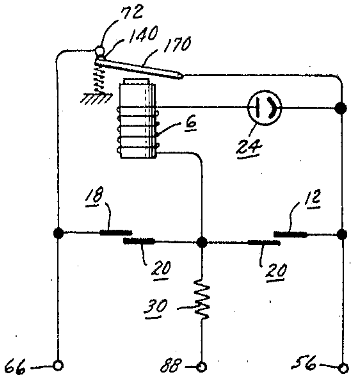
Figure 13:
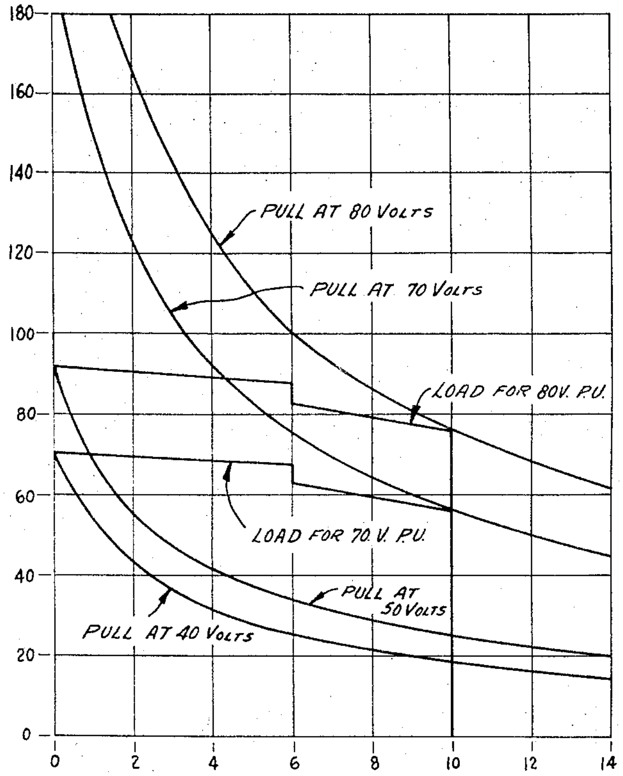

Other objects and further details of that which is believed to be novel in the invention will be clear from the following description and claims taken with the accompanying drawings wherein:

FIGURE 1 is an exploded view of a composite photoelectric relay with parts shown in perspective, FIGURE 2 is a perspective view of a cover for the composite photoelectric relay of FIGURE 1, FIGURE 3 is a side view of the composite photoelectric relay of FIGURE 1 with some portions removed and others broken away to better show the electromagnetic relay with the relay armature in its dropped-out position wherein the associated contacts are normally engaged, FIGURE 4 is a side plan view similar to FIGURE 3 with further portions removed, showing the relay armature in a second position during its pick-up movement, FIGURE 5 is a side plan view similar to FIGURE 4, showing the relay armature in its picked-up position wherein the associated contacts are disengaged, FIGURE 6 is a perspective view of the weld break arm of the composite photoelectric relay, FIGURE 7 is a perspective view of a portion of the return spring of the electromagnetic relay, FIGURE 8 is a top plan view of the composite photoelectric relay with the cover removed, FIGURE 9 is a fragmentary cross-sectional view taken along the line A—A in FIGURE 8, FIGURE 10 is a fragmentary cross-sectional view taken along the line B—B in FIGURE 8, FIGURE 11 is a side plan view of a portion of the composite photoelectric relay of modified construction, FIGURE 12 is a diagram showing the electrical circuit of the composite photoelectric relay, and FIGURE 13 is a pull and load curve for the composite photoelectric relay.

Referring to FIGURE 1, a single molded insulating base 2 is shown to provide not only a base for the composite photoelectric relay, but also provides support for components of an electromagnetic relay 4 included within the composite photoelectric relay. Plateaus of varying height, a support cradle and abutments are formed integrally with the molded base on a first side thereof to aid in the assembly of the photoelectric relay components thereon. A first sub-assembly of the electromagnetic relay including an actuating coil 6, a support frame 8, an armature 10, and a formed metal member 12 is mounted on a first raised plateau 14 formed on base 2. Also mounted on this first raised plateau are two additional formed metal members 16 and 18. Still another formed metal member 20 is mounted on a second raised plateau 22. A photo cell 24 is supported by an upstanding cradle 26 formed integrally with the base 2. Upstanding projection or abutment 28 formed integrally with the base 2 aids in positioning a resistor 30.

Before further describing the composite photoelectric relay which is the subject of this invention, the mounting of a cover 32 shown in FIGURE 2 on the base 2 will be described. This cover mounting arrangement is disclosed and claimed in application Ser. No. 542,599, entitled, Method of Calibrating Plug-In Photoelectric Control, which is assigned to the same assignee as this application, filed on this same date by Mr. Thompson, and forms no part of the present invention. The cover 32 is provided with a transparent window 34, which when secured over the composite photoelectric relay is located so as to permit light passing therethrough to impinge on photo cell 24. Circumferential portions 36 and 38 of base 2 rest on a shelf formed within a flange portion 40 of cover 32. Abutment 42 and another abutment (not shown) located diametrically opposite abutment 42 are provided with a threaded hole therein, for receiving threaded fastening devices, the heads of which engage the lower surface of the base 2 adjacent circumferential portions 44 and 46. This arrangement for securing cover 32 to base 2 permits limited rotation of the cover 32 with respect to the base 2, as is set forth in the above mentioned application. A gasket 48 is provided on the lower surface of the base 2 to engage an abutting surface of the receptacle (not shown) to which the composite photoelectric relay is connected, so as to protect the connection from dirt and other contamination.

As is best seen in FIGURES 1 and 3, the support frame 8 and the second formed metal member 12 which together comprise the metallic support means for the electromagnetic relay are secured to each other by securing means such as a pair of fastening screws 50 and 52. The screws pass through a slot (not shown) in member 12 and are received in threaded holes in frame 8. The heads of these screws lie within aperture 54 formed in base 2 so as to be accessible after the electromagnetic relay is assembled to permit adjustment of the position of support frame 8 with respect to second member 12. A second prong 56 formed as a part of member 12 is inserted through an arcuate hole 58 in the base 2. As is best seen in FIGURE 3, the member 12 is secured to the base 2 by a pair of screws 60 and 62. These screws pass through holes 64 and 66 in base 2 as shown in FIGURE 1. If adjustment of the frame 8 relative to member 12 is unnecessary, frame 8 may be formed as an integral part of member 12 as will be described later.

A first prong 68 and an upstanding arm 70 are formed as part of first member 18. A fixed contact 72 is secured to arm 70. The first prong 68 passes through an arcuate hole 74 in base 2, and the member 18 is secured to the base by a pair of screws 76 and 78. These screws pass through holes 80 and 82 in the base, and are threaded into holes 84 and 86 respectively in member 18. Thus, securing member 18 to base 2 not only secures the first prong 68 to the base, but also secures fixed contact 72 of the electromagnetic relay to the base.

A third prong 88 and an upstanding connecting tab 90 are formed as part of the third formed metal member 16.

The prong 88 passes through an arcuate hole 92 in the base 2. A screw 94 which passes through a hole 96 in base 2 is threaded into a hole 98 in member 16 to secure member 16 to the base 2. After members 12 and 18 are secured to base 2, the fourth formed metal member 20 is secured to the base 2 by a screw 100 which passes through a hole 102 in the base and is threaded into a hole 104 in member 20. Member 20 which provides voltage surge protection as will be discussed later, is provided with an upstanding connecting tab 106.

Photo cell 24 and current limiting resistor 30 are also supported by the base. In accordance with the invention, photo cell 24 is releasably mounted by cradle 26 and to this end, in the specific embodiment shown, a flange 108 of the photo cell 24 is loosely received within a groove 110 in cradle 26. The cradle 26 which is formed adjacent the perimeter of the base 2 essentially comprises a pair of upstanding abutments and a base portion between the abutments. Facing walls of the abutments and the base portion are shaped so as to conform to the shape of the perimeter of the photo cell 24. The continuous groove 110 formed in the facing walls of the abutments and in the base portion receives flange 108 of the photo cell and thereby supports the photo cell 24 along a substantial portion of its perimeter. The cradle is open at the top for releasably receiving the flange 108 in groove 110.

The connection of the leads of the photo cell, as will be discussed later when reference is made in particular to the circuit diagram shown in FIGURE 12, serves to secure the photo cell 24 within the cradle 26. Similarly, the resistor 30 is secured to the base by the connection of its leads 112 and 114 to tabs 90 and 106 respectively, as will be described later. The projection 28 served to position resistor 30 by engaging its lead 114.

Having already described the sub-assembly of the electromagnetic relay, and the member 18 which carries fixed contact 72 of the electromagnetic relay, the details of the improved electromagnetic relay will be described. Referring to FIGURE 3, the coil 6 is supported on the frame 8 by staking a magnetic core, portions of which are shown at 116 and 118 passing through the coil, to the portion 120 of the frame 8. A conductive shunting ring 122 surrounds portions 116 and 118 of the core. Armature 10 is pivotally supported upon a horizontal second leg 124 of the frame 8 with a bent tab 126 of armature 10 extending over edge 128 of horizontal leg 124. Tabs 130 and 132 extending from the armature 10 on either side of the bent tab 126 are bent out of the plane of the armature 10 so as to prevent the bent tab 126 from slipping off of the edge 128 of leg 124, by extending into a pair of notches 134 and 136 in the horizontal leg 124.

In accordance with the present invention, a resilient conductive means provides a spring bias on the armature 10, and also supports a movable contact 140. In the preferred embodiment of the invention illustrated, the resilient conductive means is in the form of a U-shaped leaf spring 138 including a first arm 142 which is secured to the armature 10 by fastening means such as a pair of rivets 144 and 146, and spaced from the armature at the point of attachment by a spacer 148 placed between the spring and the armature. The movable contact 140 is positioned at the end of this first arm 142, so as to make and break engagement with the fixed contact 72. While in the preferred embodiment of the invention the resilient conductive means is in the form of a single U-shaped leaf spring 138, it could be formed in other shapes, and of more than one piece. For instance, without changing the shape of the resilient conductive means, two separate springs could be secured by the pair of rivets 144 and 146 to armature 10, a first spring forming the first arm 142, and the second spring forming the remainder of the resilient conductive means.

To aid in holding the spring 138 in position, a prong 150 is bent out of the plane of the horizontal leg 124, and an aperture 152 is formed in connecting portions 154 of spring 138 to receive prong 150. A second arm 156 of the spring 138 is adjustably secured to the portion 120 of the frame by a securing means such as a screw 158. As is best seen in FIGURE 7, arm 156 of spring 138 includes parallel portions 160 and 162 offset by an offsetting portion 164. The screw 158 which fastens arm 156 to the portion 120 of the frame passes through an elongated slot 166 in portion 160.

The spring 138 is formed with a substantially right angle bend between connecting portion 154 and second arm 156. First arm 142 is formed at an angle of approximately 120° with the connecting portions 154, such that with the second arm 156 secured to the frame by screw 158, the movable contact 140 will be biased into engagement with the fixed contact 72, as shown in FIGURE 3. The spring load or pressure applied to the abutting contacts 72 and 140 may be adjusted by variably positioning the slot 166 with respect to the screw 158. With the spring in the position shown by the solid lines in FIGURE 3, the force applied between the contacts is greater than that applied when the screw 158 secures the spring to the frame in the position shown by the dashed lines 168 in FIGURE 3.

Considering now the operation of the electromagnetic relay, reference will be made to FIGURES 3, 4, and 5. With the actuating coil 6 deenergized or only slightly energized, the armature 10 will assume the position shown in FIGURE 3, with the movable contact 140 firmly engaging the fixed contact 72. Partial energization of the actuating coil 6 will establish a magnetic force sufficient to cause the armature 10 to be attracted toward portions 116 and 118 of the magnetic core. The armature 10 will move away from portion 170 of the first arm 142 of spring 138, and thereafter a weld breaker 172 will move into abutment with the first arm 142 as shown in FIGURE 4.

The weld breaker 172 which is shown in FIGURE 6, is attached to the armature by the rivets 144 and 146 which also secure the spring 138 to the armature. As is best seen in FIGURE 6, a notch 174 is formed in the free end of the weld breaker 172. This notch includes a narrow deep portion 176 and a wide shallow portion 178. The shallow portion 178 is slightly wider than portion 170 of the spring 138. As the armature moves toward the core upon partial energization of the actuating coil 6, surfaces 180 and 182 of the weld breaker will move into contact with portion 170 of the spring. Thereafter, further movement of the armature 10 toward the core will cause the rigid weld breaker to engage portion 170 of the spring and move the movable contact 140 away from the fixed contact 72. Finally, the armature 10 will engage portions 116 and 118 of the core as is shown in FIGURE 5.

To further disclose the advantages of the improved electromagnetic relay, reference will be made to the circuit diagram of the composite photoelectric relay as shown in FIGURE 12. The actuating coil 6 is connected in series with the photo cell 24 and the resistor 30, between termination prongs 88 and 56. The movable contact 140 which is secured to the spring 138 is connected through the frame 8 to termination prong 56. The fixed contact 72 is secured to the first member 18 and is therefore connected to termination prong 68.

Since the resistance of the photo cell 24 in series with the coil 6 changes very slowly with a slowly varying light impinging thereon, the electromagnetic relay must be designed so that the armature 10 picks-up, or is attracted to the core, without contact chatter and drops-out, or moves away from the core, with little contact bounce. In order to provide these characteristics, the spring load curve of the relay is matched to the pull, or attractive force, of the relay as shown in FIGURE 13. Referring to the graph shown in FIGURE 13, the numerals on the ordinate represent a force applied to the armature 10 at the point which is in alignment with the central axis of the core. For a particular construction of the composite photoelectric relay, the numerals may represent a force in grams. The abscissa of the graph shown in FIGURE 13 represents the length of the magnetic air gap between the armature face and the face of the core as represented by portions 116 and 118. The numerals represent for the above mentioned particular construction a distance in millimeters, such that zero indicates the armature face is in abutment with portions 116 and 118 of the core, while ten indicates a spacing of ten millimeters between the armature face and the core when the movable contact 140 engages fixed contact 172 upon full deenergization of the coil 6.

Curves 184, 186, 188, and 190 represent the attractive force exerted on the armature 10 by energization of the coil 6 at different voltage levels which are for the particular construction mentioned above, 80 volts, 70 volts, 50 volts, and 40 volts respectively. The discontinuous curves 192 and 194 represent biasing forces or loads exerted on the armature 10 by the spring 138. The discontinuous curve 192 is representative of the force when the spring is in the position shown by the solid lines in FIGURE 3, while the discontinuous curve 194 is representative of the force when the spring is in the position shown by the dashed lines 168 in FIGURE 3. The steps 196 and 198 in the discontinuous curves occur when the weld breaker 172 engages or disengages from portion 170 of the spring 138.

With the spring in the position shown by the solid lines in FIGURE 3, the force exerted on the armature 10 by the spring is represented by the discontinuous curve 192. In order for the contacts 72 and 140 to break, it can be seen by referring to FIGURE 13 that the impedance of the photo cell 24 must decrease to such a level that the voltage across coil 6 is increased to at least 80 volts, such that it exceeds the spring load on the relay armature as shown at point 200. It is also apparent from the curves, that once this voltage appears across the coil, the force exerted by coil 6 as represented by curve 184 is always greater than the force exerted on the armature by the spring as shown by discontinuous curve 192, such that the relay will be picked-up, and the armature will be pulled into abutting relationship with core portions 116 and 118, thereby separating or breaking contacts 140 and 72. With the spring remaining in this position, it may also be seen that the impedance of the photo cell 24 must increase to such a level that the voltage appearing across the actuating coil 6 is reduced to a value such that the force exerted by the coil on the armature corresponds to that shown by curve 188. The force exerted by the coil as shown by curve 188, is always less than the force exerted by the spring as shown by the curve 192, such that the relay will drop-out, with contact 140 engaging contact 72 and limiting further opening of the armature.

If the spring is moved to the position shown by the dashed lines 168 in FIGURE 3, the force applied to the armature 10 by the spring 138 will be reduced, as shown by the discontinuous curve 194, compared to the force applied as represented by curve 192 for a given air gap length. With the spring in this position, it can be seen that application of a lesser voltage to the coil to develop a force acting on the armature corresponding to curve 186 will be sufficient to cause the armature to pick up. Similarly, application of a lesser voltage to the coil to develop a force acting on the armature corresponding to curve 190 will cause the armature to drop-out. Thus, it is seen that by merely adjusting the position of the slot 166 with respect to the screw 158 in the frame, it is possible to adjust the pick-up and drop-out voltage of the relay.

Since the movable contact 140 does not part from or move toward the fixed contact 72 until the spring load curve such as 192 or 194 passes through its discontinuity such as 196 and 198, any chatter of the armature due to energization of the coil does not result in similar chatter of the movable contact, which would have an adverse effect on the contacts. Rather, the contacts are only subjected to quick makes and quick breaks. If any welding of the contacts should occur, when the walls 180 and 182 of the weld breaker 172 hit portion 170 of the arm, the weld will be broken and the contacts immediately opened.

As previously discussed with respect to the metallic support means, the support frame 8 is attached to a second formed metal member 12 by a pair of screws 50 and 52, for the purposes of adjusting the horizontal position of the movable contact 140 with respect to the fixed contact 72 as viewed in FIGURE 3. This adjustment might also be provided by bending the arm 70 which supports the fixed contact 72 or by bending the frame 8. If adjustment of the position of the contacts is provided in this manner, the frame 8 and the formed metal member 12 could be formed from a single piece of metal as is shown in FIGURE 11. This would of course reduce the number of pieces used in assembling the composite photoelectric relay.

Whereas the composite photoelectric relay of the type just described is frequently mounted on the street lighting luminaire which is to be controlled, and directly connected to power lines, it is frequently subjected to voltage surges, such as might be caused by lightning striking the power lines. To provide protection from such voltage surges, built-in protective spark gaps are provided in accordance with the invention in the composite photoelectric relay. The protective spark gaps comprise the formed sheet metal members 12, 18, and 20, as is best seen in FIGURES 8, 9, and 10. Tab 202 formed on metal member 20, extends over a portion of the formed member 12 as is best seen in FIGURE 9. Similarly, as is best seen in FIGURE 10, tab 204 formed on metal member 20 extends over the formed member 18. Equal length air gaps are thereby provided between tab 202 and member 12, and tab 204 and member 18. As is shown in the circuit diagram of FIGURE 12, this arrangement provides a pair of spark gaps, one of which is in parallel with the series circuit comprising the relay coil 6 and the photo cell 24, and the other of which is between termination prong 68 and the terminal of the relay connected to member 20, such that the two gaps serve to protect the relay. The resistor 30 connected between member 20 and the third formed metal member 16 which includes prong 88, is provided to limit the current flow through the spark gaps, such that an arc will not be maintained across a gap due to line voltage alone. Depending upon the length of the air gaps and the normal line voltage, the resistor 30 may not be needed.

While particular embodiments of this invention have been shown and described, it will be obvious to those skilled in the art that various changes and modifications may be made without departing from this invention in its broader aspects and, therefore, it is intended that the appended claims cover all such changes and modifications as fall within the true spirit and scope of this invention.

I claim:

1. An electromagnetic relay comprising:

(a) an insulating base, (b) a first formed metal member mounted on said base, (c) a fixed contact supported by said first member, (d) a metallic support means mounted on said base, (e) a magnetic core supported by said support means, (f) an actuating coil surrounding at least a portion of said core, (g) an armature pivotally supported by said support means for actuation toward said core by energization of said actuating coil, (h) resilient conductive means having a free end and a fixed end, said resilient means secured intermediate its ends to said armature, so that said free end of said resilient means is actuated by actuation of said armature, (i) securing means mounting said fixed end of said resilient means to said support means for adjustment with respect to at least a part of the support means so that said resilient means exerts a predetermined adjustable force on said armature to normally bias said armature away from said core, and (j) a movable contact secured to said free end of said resilient means and biased thereby into normal engagement with said fixed contact, said movable contact being mounted for movement out of engagement with said fixed contact when the voltage applied to said actuating coil exceeds a predetermined pick-up voltage, and for movement into engagement with said fixed contact due to the predetermined force exerted by said resilient means when the voltage applied to said actuating coil drops below a predetermined drop-out voltage which is less than the predetermined pick-up voltage, whereby securing said fixed end of said resilient means to said support means by said securing means in a first predetermined position causes said relay to have a first predetermined pick-up voltage, and a first predetermined drop-out voltage, and securing said fixed end of said resilient means to said support means by said securing means in a second predetermined position causes said relay to have a second predetermined pick-up voltage different from the first and a second predetermined drop-out voltage different from the first.

2. The electromagnetic relay defined in claim 1, wherein said fixed end of said resilient means is provided with a slot therein, and said securing means is a screw having a cylindrical portion and an enlarged head, said cylindrical portion passing through said slot, said head engaging said fixed end, the position of the slot with respect to said support means being adjusted to a predetermined position, and said cylindrical portion being secured to said second member, whereby said head engages said fixed end to secure said fixed end to said support means.

3. The electromagnetic relay defined in claim 1, wherein said metallic support means includes a metal frame formed in a U-shape, having a first leg, a second leg, and a base portion, said first leg mounted on said insulating base, said base portion supporting said magnetic core, said core extending between said first and second legs, said armature pivotally supported by said second leg, and said resilient conductive means is in the form of a U-shaped spring having a first arm, a second arm, and a connecting portion, said first arm secured to said armature intermediate its ends, said movable contact secured to said free end of said first arm, said second arm being adjustably mounted on said base portion of said second member by said securing means.

4. The electromagnetic relay defined in claim 1 comprising in addition a weld breaker, said weld breaker having first and second portions, said first portion secured to said armature, said second portion normally being spaced from the free end of said resilient member when the contacts are engaged, and being positioned to engage said free end of said resilient member after said armature begins to move toward said core when the voltage applied to said actuating coil exceeds a predetermined pick-up voltage, but before said movable contact moves out of engagement with said fixed contact, whereby said second portion of said weld breaker strikes said free end of said resilient member to break any weld which may have occurred during engagement of said fixed contact and said movable contact.

5. The electromagnetic relay defined in claim 1, wherein a plurality of apertures pass through said base, said first member is formed with a first prong which passes through one of said apertures, said metallic support means including a second formed metal member formed with a second prong which passes through another one of said apertures, whereby said prongs may be inserted into a receptacle for connecting said fixed and said movable contacts in a circuit connected to the receptacle.

6. An electromagnetic relay comprising:
(a) an insulating base,
(b) a first formed metal member mounted on said base,
(c) a fixed contact supported by said first member,
(d) a metallic support means including,
(i) a second formed metal member mounted on said base,
(ii) a metal frame,
(e) securing means mounting said metal frame to said second member for adjustment with respect to said second member,
(f) a magnetic core supported by said support means,
(g) an actuating coil surrounding at least a portion of said core,
(h) an armature pivotally supported by said support means for actuation toward said core by energization of said actuating coil,
(i) resilient conductive means having a free end and a fixed end, said resilient means secured intermediate its end to said armature, so that said free end of said resilient means is actuated by actuation of said armature,
(j) a movable contact secured to said free end of said resilient means and biased thereby into normal engagement with said fixed contact, said movable contact being mounted for movement a predetermined distance out of engagement with said fixed contact when the voltage applied to said actuating coil exceeds a predetermined pick-up voltage, and for movement into engagement with said fixed contact due to the predetermined force exerted by said resilient means when the voltage applied to said actuating coil drops below a predetermined drop-out voltage which is less than the predetermined pick-up voltage, adjustment of said metal frame with respect to said second member adjusting said predetermined distance of movement of said movable contact.

7. The electromagnetic relay defined in claim 6 comprising in addition a weld breaker, said weld breaker having first and second portions, said first portion secured to said armature, said second portion normally being spaced from the free end of said resilient member when the contacts are engaged, and being positioned to engage said free end of said resilient member after said armature begins to move toward said core when the voltage applied to said actuating coil exceeds a predetermined pickup voltage, but before said movable contact moves out of engagement with said fixed contact, whereby said second portion of said weld breaker strikes said free end of said resilient member to break any weld which may have occurred during engagement of said fixed contact and said movable contact.

8. A composite photoelectric relay including an electromagnetic relay comprising:
(a) an insulating base having a first side and a second side opposite said first side,
(1) an insulating mounting cradle formed on said first side of said base,
(b) a first formed metal member mounted on said first side of said base,
(1) a first prong positioned on said second side of said base, and electrically connected to said first member,
(c) a fixed contact of said electromagnetic relay supported by said first member,
(d) metallic support means mounted on said first side of said base including a second formed metal member,
(1) a second prong positioned on said second side of said base, and electrically connected to said second member,
(e) a magnetic core supported by said metallic support means,
(f) an actuating coil surrounding at least a portion of said core,
(g) an armature pivotally supported by said metallic support means for actuation toward said core by energization of said actuating coil,
(h) resilient conductive means having a free end and a fixed end, said resilient means secured intermdiate its ends to said armature and at its fixed end to said metallic support means, so that said free end of said resilient means is actuated by actuation of said armature and said armature is biased away from said core,
(i) a movable contact secured to said free end of said resilient means and biased thereby into normal engagement with said fixed contact, said movable contact being mounted for movement out of engagement with said fixed contact when the voltage applied to said actuating coil exceeds a predetermined pick-up voltage and said armature is attached to the core, and for movement into engagement with said fixed contact due to the force exerted by said resilient means when the voltage applied to said actuating coil drops below a predetermined dropout voltage which is less than the predetermined pick-up voltage,
(j) a third formed metal member, said third member mounted on said first side of said base,
(1) a third prong positioned on said second side of said base, and electrically connected to said third member,
(k) a photo responsive device releasably mounted in said cradle, said device and said actuating coil being connected in a first circuit between two of said prongs including said third prong, said prongs adapted from connection to a voltage source to supply to said actuating coil a voltage which, when the impedance of said photo responsive device is reduced by the impingement of light thereon, exceeds the predetermined pick-up voltage, such that said movable contact moves out of engagement with said fixed contact to open a circuit between said first prong and said second prong through said movable and said fixed contact.

9. The composite photoelectric relay defined in claim 8 comprising in addition a surge protection means, said means including a spark gap connected in parallel with said first circuit to protect said circuit from voltage surges.

10. The composite photoelectric relay defined in claim 8 wherein a plurality of apertures pass through said base, and including a first piece of metal, said first member and said first prong integrally formed from said first piece of metal, with said first prong extending through one of said apertures, a second piece of metal, said second member and said second prong integrally formed from said second piece of metal, with said second prong extending through another one of said apertures, and a third piece of metal, said third member and said third prong integrally formed from said third piece of metal, with said third prong extending through still another one of said apertures.

11. The composite photoelectric relay defined in claim 1 wherein said metallic support means, and said second prong are integrally formed from said second piece of metal.

12. The composite photoelectric relay defined in claim 8 comprising in addition a fourth formed metal member, including a main portion and first and second tabs extending from said main portion, said main portion mounted on said first side of said base, said first tab spaced a predetermined distance from said first member so as to form a first spark gap, said second tab spaced a predetermined distance from said second member so as to form a second spark gap, said fourth member being connected in circuit with said actuating coil so as to protect said actuating coil, said photoresponsive element, said fixed contact, and said movable contact from voltage surges appearing at said prongs.

13. The composite photoelectric relay defined in claim 8 wherein said insulating mounting cradle is formed adjacent the perimeter of said base and comprising a base portion and a pair of upstanding abutments formed on each side of said base portion, said abutments having a pair of facing walls, a continuous groove formed in said facing walls and said base portion, a portion of the perimeter of said device being releasably received in said groove in said cradle for supporting said device, and wherein the circuit opened by said contacts moving out of engagement includes said first formed metal member, and said metallic support means.

References Cited

UNITED STATES PATENTS

| | | | |
|---|---|---|---|
| 3,048,833 | 8/1962 | Bernheim | 317—124 X |
| 3,128,413 | 4/1964 | Person | 317—124 |
| 3,334,271 | 8/1967 | Bacon | 317—124 X |

LEE T. HIX, *Primary Examiner.*

J. D. TRAMMELL, *Assistant Examiner.*